July 14, 1959             J. B. DUKE             2,894,628
CLAY BRIGHTNESS BY FLOTATION
Filed July 13, 1956
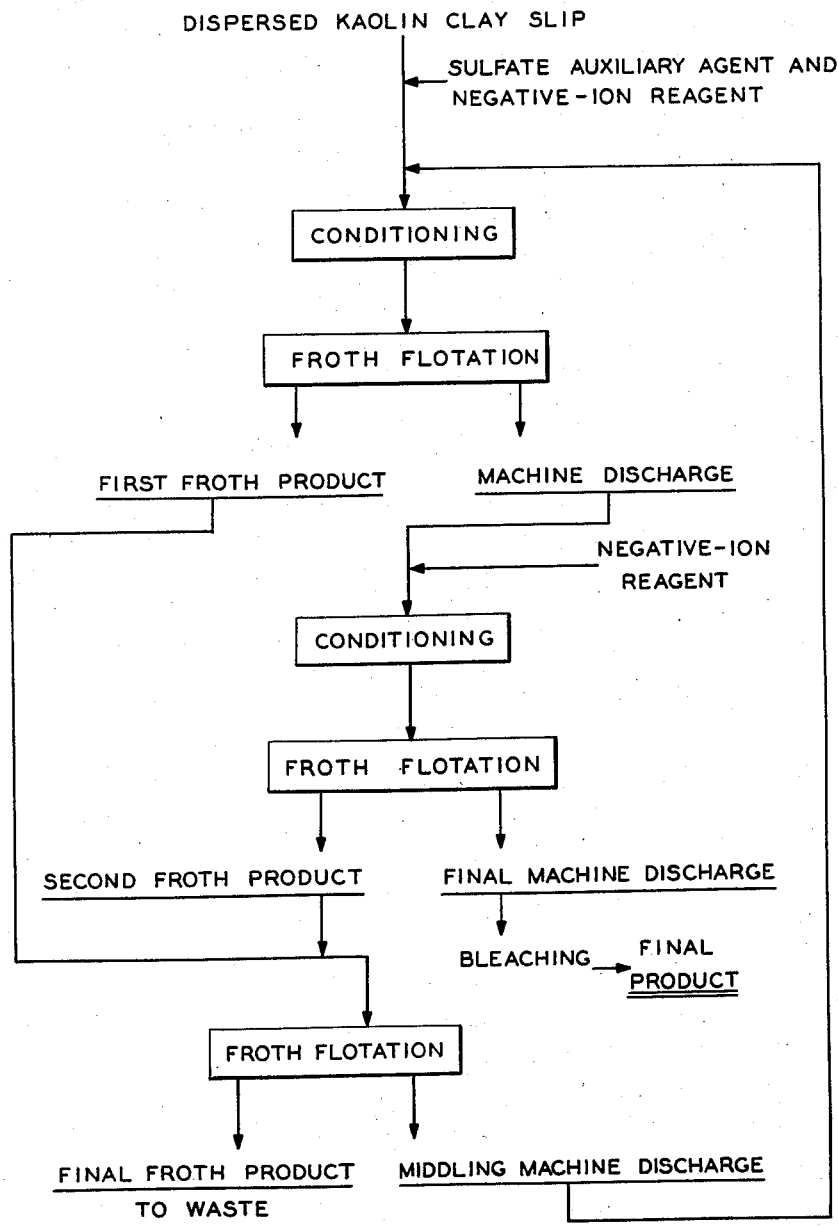
INVENTOR.
JAMES B. DUKE
ATTORNEY 2,984,628

CLAY BRIGHTNESS BY FLOTATION

James B. Duke, New Brunswick, N.J., assignor to Minerals & Chemicals Corporation of America, Menlo Park, N.J., a corporation of Maryland Application July 13, 1956, Serial No. 597,587

11 Claims. (Cl. 209—166)

This invention relates to a process for improving the brightness of clays. More specifically, the invention relates to a process for improving the brightness of kaolin clays so as to render them especially suitable as extender pigments in white and pastel paints, particularly flat wall paints.

At the present time kaolin clays are used in significant amounts as extender pigments in paints. The function of extender pigments in paints is to "extend" the functionality of the prime pigments and, among other things, they contribute to the hiding power of paint films and they help to strengthen said films.

An extender pigment, to be acceptable for use in a white or pastel paint, should preferably be of sufficient whiteness, or brightness, to insure against its imparting a visibly detectable off-white shade to a white paint film or a "muddy" appearance to a pastel paint film. As is well known to those skilled in the art, kaolin clays mined in the United States are noted for their low brightness due to certain discoloring impurities which they contain. The discoloration of domestic kaolin is usually attributed, among other things, to the presence of iron but there is no clear understanding of how the iron occurs in the clay. One school of thought holds to the theory that the iron is probably present as a silicate and that only a minute percentage of said iron could be removed from the clay without decomposition thereof. It has also been postulated that the iron is present as a stain on titanium minerals adhering to the kaolinite, particularly in the case of Georgia kaolins, and that it can only be removed from the clay physically by methods which involve detachment of said titanium minerals from the kaolinite, as by means of shearing.

Present methods of refining naturally occurring kaolin clays for commercial use in paints entail blunging (disintegration of the crude clay in water), fractionation, bleaching and filtering operations. The bleaching is for the purpose of improving the brightness or whiteness of the clay and it is usually accomplished with either zinc or sodium hydrosulfite, the hydrosulfite acting to reduce insoluble oxides of iron to soluble ferrous compounds which can then be removed by filtration. Although conventional bleaching does improve the brightness of kaolins to a considerable degree, it nevertheless fails in many cases to whiten them to the desired extent. Thus conventionally bleached domestic kaolins, while brighter than unbleached kaolins, are usually possessed of a greyish shade which can not be removed by further bleaching or other treatment heretofore known.

The present invention is the result of my discovery of an economical froth flotation method of removing colored impurities from dispersed kaolin clays by means of which said colored impurities are selectively floated from the clays. In order to obtain the desired results it is necessary to disperse the clay prior to conditioning with the flotation reagents hereinafter mentioned, the dispersion being accomplished with dispersing agents well-known to those skilled in the art such as for example, sodium silicate, sodium carbonate, etc. I am aware of U.S. Patent No. 2,569,680 to Leek which broadly covers whitening of clay by flotation using as the collector an emulsion containing both negative-ion and positive-ion reagents. My invention, however, constitutes an improvement over the process of Leek in that I have discovered a simple and economical method of eliminating or removing discoloring impurities from the kaolin clays, and particularly kaolin clays from which the fine particles have been separated, using a negative-ion reagent as the sole collector especially in the presence of an auxiliary agent of the type hereinafter specified.

My new flotation treatment can be used in place of a conventional bleaching step, or it can be employed in conjunction with bleaching in which case a marked improvement in brightness of final product results.

My invention provides an economical method of brightening kaolin clays to an extent hitherto unattainable, resulting in an enhancement of their value as extender pigments for white and pastel paints, particularly flat wall paints. By employing my flotation treatment prior to a bleaching step, kaolin clays can be brightened so as to render them superior, as extender pigments, to conventionally bleached clays. Clays which have been brightened by the process of my invention can of course be used advantageously for any application which requires a comparatively bright product; for example, my brightened clay is useful as a polyester resin filler, as a paper filler, for ceramic applications, etc.

It is thus a principal object of my invention to provide a new and economical method of brightening kaolin clays to a relatively greater extent than can be accomplished by conventional bleaching operations now in commercial practice.

It is another object of the invention to furnish a novel economical means for brightening kaolin clays to an extent sufficient to render them excellent for use as extender pigments in white and pastel paints, particularly flat wall paints.

Other objects and features of the invention will be readily apparent from the description and examples thereof which follow.

Briefly, the essence of my invention resides in the use of a novel flotation method for removing colored impurities from clays. I have found that colored impurities can be removed from kaolin clays, and their brightness thus improved to a substantial degree, by subjecting said clays to froth flotation treatment with negative-ion reagents and preferably in the presence of an auxiliary agent from the group of soluble sulfates consisting of ammonium sulfate, magnesium sulfate, and potassium sulfate. The function of the sulfate auxiliary agent in my flotation process is not clearly understood. In this connection it should be pointed out that other soluble sulfates are not useful as auxiliary agents since they do not give the beneficial results of the above-mentioned ones. It is particularly interesting to note that sodium sulfate shows no substantial advantage as an auxiliary agent, whereas potassium sulfate, which is closely related thereto, is one of my auxiliary agents. The amount of auxiliary agent used has not been found to be critical and an amount from 0.5 to 10.0 pounds per ton (dry feed basis) has usually been found to be sufficient.

In carrying out my flotation treatment, any well-known negative-ion collector such as a fatty acid or fatty acid salt may be used. I prefer to use tall oil (an oleic acid product of vegetable extraction) as the collector because of its relatively low cost but any equivalent negative-ion collector, as for example red oil (oleic acid of animal source), linoleic acid, or sulpho-oleic-acid may be employed within the scope of my invention. My flotation operation should be carried out on an alkaline pulp and where necessary, an alkaline reagent may be added to said pulp to adjust its pH to the proper value. For best results the pH of the pulp during conditioning should fall within the range from about 8 to about 10. If desired, a suitable frother, such as for example pine oil, may be used in my flotation operation. The alkaline material for pH adjustment should preferably be the hydroxide of the cation of the particular sulfate employed where possible, such as ammonium hydroxide when ammonium sulfate is the auxiliary agent, etc. However, in the case where magnesium sulfate is used as the auxiliary agent the corresponding hydroxide, i.e., $Mg(OH)_2$, cannot be employed because of its relative insolubility in water and hence some other alkaline material, as for example sodium hydroxide, should be used.

The accompanying flow sheet which constitutes a part of the specification illustrates an embodiment of my invention wherein the beneficiated clay is subjected to further conditioning and froth flotation treatment to produce a second froth-product concentrate of colored impurities and a final beneficiated clay product and the combined froth products are subjected to further froth flotation.

Although I have not fully identified the colored impurities in kaolin, or determined how they occur therein, it is my belief that the major portion of these impurities are discrete discolored anatase particles, anatase being one of the crystalline forms of titanium dioxide.

My flotation process is particularly useful for brightening the coarser fractions of kaolin clay, although the crude clay itself, prior to fractionation thereof into various particle size fractions, can be substantially brightened by said process. However, the flotation operation loses much of its effectiveness when the clay feed is of too fine a particle size. My invention is particularly suitable for the treatment of such coarser kaolin fractions as exemplified by those clays of commerce containing not more than about 30 percent by weight of minus-2-micron (equivalent spherical diameter) particles and not more than about 15 percent by weight of minus-1-micron particles. These coarser kaolin fractions are superior to finer clay fractions as paint extender pigments, particularly flat wall paint extender pigments, because of their greater contribution to flatness and their greater durability.

Following are examples which illustrate certain embodiments of my invention. These examples are included for illustrative purposes only and are not to be construed as limiting the invention to the particular modifications of said invention disclosed therein.

*Example I*

This example illustrates the improvement in the brightness of kaolin which has been treated as taught herein over kaolin which has been brightened by a conventional bleaching procedure.

A 2500 gram sample (dry weight basis) of a relatively coarse fraction of a dispersed water-washed Georgia kaolin (in the form of a 24.4 percent solids slip) was pulped with water into a 5000-gram laboratory Minerals Separation Airflow Flotation machine to a concentration of about 10 percent solids. The kaolin of this example was a relatively coarse fraction of a water-washed clay comprised of particles of such size distribution that about 25 percent by weight were smaller than 2 microns in equivalent spherical diameter and about 12 percent by weight were smaller than 1 micron in equivalent spherical diameter.

The kaolin pulp was conditioned in the flotation machine with 3.0 red oil, 1.0 magnesium sulfate, 0.2 pine oil and 0.8 caustic soda for a period of 5 minutes, the conditioning being accomplished by operating said flotation machine with the air inlet passage blocked. The quantities of reagents are given as pounds per ton of dry feed. The pH of the conditioned pulp was found to be 9.2.

The conditioned pulp in the flotation machine was subjected to froth flotation treatment therein for 15 minutes, the froth flotation treatment being effected in the normal fashion by operating the machine with the air inlet passage open.

The pulp in the flotation machine, from which a froth product had been removed during the aforesaid 15-minute flotation treatment, was again conditioned for 5 minutes (by agitation without admittance of air) after the addition of 2.0 red oil, 0.2 pine oil and 0.4 caustic soda, all reagent quantities being given as pounds per ton of dry feed.

The reconditioned pulp was subjected to froth flotation treatment in the flotation machine, this time for a period of 7½ minutes. The products from this flotation step were a froth-product representing a concentration of colored impurities and a machine-discharge comprising a brightened kaolin product considerably lower than the original feed clay in $TiO_2$ content. Although, as previously pointed out, the nature of the colored impurities in kaolin is not fully understood, it has been experimentally demonstrated that as a general rule the brightness of a kaolin varies inversely as its $TiO_2$ content, the lower the $TiO_2$, the greater the brightness. The flotation treatment described above produced a final machine-discharge of 0.46 percent $TiO_2$ from a feed containing a calculated $TiO_2$ content of 1.44 percent. Thus, a marked reduction in $TiO_2$ was effected by said flotation treatment indicating that a substantial increase in brightness resulted therefrom.

The above-described flotation procedure was repeated on another batch of the relatively coarse kaolin except for minor variations in reagent quantities. Thus the quantities of red oil employed in the two conditioning operations were 3.6 and 2.4 pounds per ton of dry feed, respectively, and the quantities of caustic soda were 0.9 and 0.5 pound per ton of dry feed, respectively. The pH of the conditioned pulp in this case was 9.0. The final machine-discharge from this treatment was found to contain a $TiO_2$ content of 0.42 percent.

The two machine-discharge products were mixed and the mixture, which was found by analysis to contain 0.43 percent $TiO_2$, was tested for brightness by TAPPI Standard Method T-646m-54, as described on pages 159A and 160A of the October 1954 issue of TAPPI (a monthly publication of the Technical Association of the Pulp and Paper Industry). This method measures the light reflectance of a clay sample and thus gives quantitative indication of its brightness or whiteness.

Part of the mixture was bleached with a conventional zinc hydrosulfite bleaching liquor and a brightness determination was made on this material. The brightnesses of these two clay samples (with and without bleaching treatment, respectively) appear below compared to an average brightness, determined in the same fashion, of a kaolin of equivalent particle size distribution prepared by the conventional method of water-washing, fractionation and bleaching.

| Method of preparation: | Brightness, percent |
|---|---|
| Conventional washing and bleaching | About 81 |
| Brightening by flotation | 81.5 |
| Brightening by flotation with subsequent bleaching | 85.1 |

The above figures show that my flotation method of brightening kaolin produced by itself a brightness slightly superior to, or at least equal to, the conventional bleaching method for brightening clay. The table also shows that when my flotation treatment is followed by bleaching, a substantial improvement in brightness over that heretofore attainable, results.

Next, several samples of flat white wall paint were prepared using my flotation brightened and bleached kaolin in some and using commercially bleached kaolin of an equivalent particle size distribution in the rest. The object of these preparations was to compare the brightnesses of paints made with commercially available bleached clays with the brightnesses of paints made with clays prepared in accordance with my improved method of beneficiation. The commercially bleached kaolin used in the above-mentioned paints was ASP 400, a clay product of Minerals & Chemicals Corporation of America.

Four batches of alkyd flat white paints were made up using ASP 400 as the extender pigment in two, and my bleached flotation kaolin as the extender pigment in the other two. These four paint batches comprised two sets of comparative paints, each set in turn comprising two separate paint batches which differed from each other only in that one contained ASP 400 as an extender pigment, whereas the other contained my bleached flotation product in like amount as the extender pigment. The two sets differed from each other in that one of them contained calcium sulfate in addition to the kaolin as an extender pigment, whereas the other contained only clay as an extender pigment. Drawdowns were prepared from these four white paint samples by applying in each case a wet paint film of six-mil thickness on a Morest hiding power chart (black and white, form 015) using a Bird applicator. These drawdowns clearly showed that those paints containing my bleached flotation kaolin as an extender were visually much brighter than those comparative paints containing ASP 400 as the extender.

In addition to a visual observation of the drawdowns the paint films were tested for directional reflectance to obtain quantitative comparisons of their respective brightnesses. The directional reflectance evaluations were made by Method 612.1, dated January 15, 1949, of Federal Specification TT-P-141b. The directional reflectance of a surface is expressed as a percentage and is defined as the daylight reflectance an ideally diffusing specimen would have to have to appear as bright as the test specimen when both are illuminated at 45° by daylight and viewed perpendicularly by a normal observer.

The directional deflectance values for the four paint drawdowns were 88.8 and 84.6 percent for the paints containing the ASP 400 and 90.1 and 89.2 percent, respectively, for the comparative paints containing my bleached flotation kaolin. These comparative figures clearly demonstrate the greater reflectances and hence greater brightnesses of the paint films containing the bleached flotation kaolin.

The "yellowness" of each of the four drawdowns was evaluated as indicated in Method 613.1, dated January 15, 1949, of Federal Specification TT-P-141b. The yellowness of a white paint film gives a quantitative indication of the deviation of said film from a pure white color, the greater the yellowness value, the greater the extent of color deviation or "off-whiteness," of the paint.

Yellowness values for the four drawdowns were 0.214 and 0.255 for the paints containing the ASP 400 and 0.155 and 0.157, respectively, for the comparative paints containing my bleached flotation kaolin. These comparative yellowness values emphatically attest to the superiority in whiteness achieved by substitution of my bleached flotation kaolin for the conventionally bleached ASP 400 extender pigment in flat white wall paints.

Thus, it has been proven in this example that my new method of brightening clays effects substantial reduction of the colored impurities in a domestic kaolin clay product, as indicated by TiO₂ analysis and brightness determinations of the beneficiated clay; it has also been proven that my beneficiated clay can be substituted for a conventionally bleached kaolin, of approximately the same particle-size distribution, as a flat white paint extender to yield white paints of superior whiteness and reduced yellowness.

*Example II*

This example includes a series of four comparative flotation tests differing from each other in the auxiliary agent employed and a fifth test in which no auxiliary agent was used.

The feed for each of the five flotation tests was the same dispersed, relatively coarse kaolin as that employed in Example I. In each test the kaolin, in the form of an aqueous slip, was conditioned for five minutes with the negative-ion and auxiliary (where used) reagents and the thus-conditioned feed, in the form of a 10 percent solids pulp, was subjected to froth flotation treatment for a period of five minutes during which a froth-product comprising a concentrate of colored impurities was separated therefrom. After the five minutes of froth flotation the pulp, in each case, was conditioned with additional negative-ion reagents for five minutes (in the flotation cell) and then subjected again to five minutes of froth flotation treatment during which a second froth-product concentrate of colored impurities was obtained. The two froth-products were then combined (except in the test where no auxiliary was used) and subjected to a cleaner flotation treatment, in the same flotation cell as that used earlier, thus yielding a final froth-product concentrate of colored impurities and a middling product.

The object of the final cleaner flotation step was to demonstrate that by the incorporation of such an operation into my new brightening process, a clay product of intermediate TiO₂ grade (middling), which might find use in certain applications, and a product high in TiO₂ (final froth-product) which might be of value for recovery of said TiO₂ can be produced, in addition to the primary brightened clay product (machine-discharge) of said process. The accompanying flow sheet illustrates the steps hereinabove described.

The flotation cell used for the present tests was a laboratory Minerals Separation Sub-A Flotation machine of about 250-gram (dry feed clay basis) capacity.

The quantities of reagents used in the five tests of this example appear below, all quantities being given as pounds per ton of dry kaolin feed.

TEST NO. 1

| Reagent | Quantity for First Conditioning | Quantity for Second Conditioning |
|---|---|---|
| Sodium Hydroxide | 1.0 | |
| Red Oil | 3.0 | 2.0 |
| Pine Oil | 0.2 | 0.2 |
| Conditioner pH: 9.2. | | |

TEST NO. 2

| Reagent | Quantity for First Conditioning | Quantity for Second Conditioning |
|---|---|---|
| Sodium Sulfate | 1.0 | |
| Sodium Hydroxide | 1.2 | 0.6 |
| Red Oil | 3.6 | 2.4 |
| Pine Oil | 0.2 | 0.2 |
| Conditioner pH: 9.1. | | |

TEST NO. 3

| Reagent | Quantity for First Conditioning | Quantity for Second Conditioning |
|---|---|---|
| Ammonium Sulfate | 1.0 | |
| Ammonium Hydroxide | 5.0 | 2.5 |
| Red Oil | 3.6 | 2.4 |
| Pine Oil | 0.2 | 0.2 |
| Conditioner pH: 9.2. | | |

TEST NO. 4

| Reagent | Quantity for First Conditioning | Quantity for Second Conditioning |
|---|---|---|
| Magnesium Sulfate | 1.0 | |
| Ammonium Hydroxide | 5.0 | 2.5 |
| Red Oil | 3.6 | 2.4 |
| Pine Oil | 0.2 | 0.2 |
| Conditioner pH: 9.2. | | |

TEST NO. 5

| Reagent | Quantity for First Conditioning | Quantity for Second Conditioning |
|---|---|---|
| Potassium Sulfate | 1.0 | |
| Potassium Hydroxide | 2.4 | 1.4 |
| Red Oil | 3.6 | 2.4 |
| Pine Oil | 0.2 | 0.2 |
| Conditioner pH: 9.1. | | |

Tabulated metallurgical results of the above-described tests are below. All feed TiO$_2$ percentages are calculated values.

TEST 1 (No Auxiliary)

| Product | Percent Weight | Percent TiO$_2$ |
|---|---|---|
| Feed | 100 | 1.41 |
| Machine-discharge | 57.8 | 0.76 |

TEST 2 (Sodium Sulfate)

| Product | Percent Weight | Percent TiO$_2$ |
|---|---|---|
| Feed | 100 | 1.34 |
| Froth-product | 1.9 | 14.74 |
| Middling | 12.5 | 2.41 |
| Machine-discharge | 85.6 | 0.89 |

TEST 3 (Ammonium Sulfate)

| Product | Percent Weight | Percent TiO$_2$ |
|---|---|---|
| Feed | 100 | 1.32 |
| Froth-product | 2.3 | 19.20 |
| Middling | 14.6 | 1.99 |
| Machine-discharge | 82.4 | 0.48 |

TEST 4 (Magnesium Sulfate)

| Product | Percent Weight | Percent TiO$_2$ |
|---|---|---|
| Feed | 100 | 1.30 |
| Froth-product | 4.2 | 8.72 |
| Middling | 25.5 | 1.86 |
| Machine-discharge | 70.3 | 0.66 |

TEST 5 (Potassium Sulfate)

| Product | Percent Weight | Percent TiO$_2$ |
|---|---|---|
| Feed | 100 | 1.26 |
| Froth-product | 3.4 | 16.61 |
| Middling | 17.8 | 1.81 |
| Machine-discharge | 78.8 | 0.48 |

The above results show that in all cases a machine-discharge of substantially lower TiO$_2$ content than the original feed was produced. As previously explained, there is close correlation between the brightnesses of domestic kaolins and their TiO$_2$ contents (the lower the TiO$_2$, the higher the brightness) and thus it is obvious that the flotation tests of this example each produced a machine-discharge having a brightness substantially superior to that of the feed clay.

The above results also show that although every test produced a machine-discharge product of lowered TiO$_2$ content, those tests in which ammonium sulfate, magnesium sulfate and potassium sulfate, respectively, were employed as auxiliary agents were each markedly superior to the test in which no auxiliary was used and to that in which sodium sulfate was the auxiliary.

*Example III*

This is an example of my flotation process in which neither an auxiliary agent nor a frother was employed. Tall oil was used as the negative-ion collector and ammonium hydroxide as the pH control agent.

A 500-gram charge (dry kaolin weight basis) of the same dispersed, relatively coarse kaolin as that used in the previous examples was conditioned, in the form of an aqueous pulp of 10 percent solids content, with ammonium hydroxide and tall oil by first adding the ammonium hydroxide to the pulp and vigorously stirring it (by mechanical means) for five minutes, then adding the tall oil to said pulp and vigorously stirring it for an additional five minutes. Equal amounts of ammonium hydroxide and tall oil were added, 2.0 pounds per ton of dry kaolin feed.

The conditioned kaolin pulp was subjected to froth-flotation treatment, in a laboratory flotation machine, for a period of five minutes during which a froth-product concentrate of TiO$_2$ was removed therefrom. After the five minutes of flotation, the pulp remaining in the flotation machine was conditioned again with ammonium hydroxide and tall oil by adding 0.5 lb./ton (dry feed basis) of the former to said pulp, vigorously stirring the pulp by mechanical means for five minutes, adding 0.5 lb./ton (dry feed basis) of the tall oil to the hydroxide-conditioned pulp and again stirring said pulp vigorously for five minutes. The thus-conditioned pulp was again subjected to five minutes of froth flotation treatment and a second froth-product removed, leaving behind a machine-discharge of 0.55 percent TiO$_2$ content; the weight of the machine-discharge was equivalent to 77.5 percent of the feed weight (dry solids weight basis).

The results of this example show that flotation without an auxiliary, using tall oil as the collector, produced a brightened clay product (machine-discharge) as evidenced by the substantially lowered TiO$_2$ content (by comparison with the feed clay) of said product.

*Example IV*

This example was the same as Example III except that 2.0 pounds per ton (dry feed basis) of ammonium sulfate was used as an auxiliary agent in the first conditioning step. Here, as in Example III, the conditioning was carried out by adding the flotation reagents one at a time and stirring the pulp for five minutes after the addition of each reagent. The order of addition of the reagents during the first conditioning step was: ammonium sulfate, ammonium hydroxide, tall oil.

This example produced a machine-discharge of 0.48 percent TiO$_2$ and a weight recovery of 78.8 percent. These results compared with those of Example III show that the use of ammonium sulfate as an auxiliary agent resulted in a product superior to that achieved without an auxiliary agent in that the former product was of lower TiO$_2$ content and it represented slightly higher weight recovery than the latter.

*Example V*

This example was similar to Example IV except that sodium hydroxide was used as the pH control agent rather than ammonium hydroxide. The quantity of sodium hydroxide added during the first conditioning step was equivalent to 1.1 pounds per ton (dry feed basis) and that added during the second conditioning step was equal to 0.3 pound per ton (dry feed basis).

The machine-discharge product of this example contained 0.48 percent TiO$_2$ and represented a weight recovery of 78.3 percent. Comparison of these results with those of Example IV shows that the substitution of sodium hydroxide for ammonium hydroxide had substantially no effect on either TiO$_2$ grade of the machine-discharge product or weight recovery achieved in said product.

*Example VI*

This example was similar to Example V with the following exceptions: magnesium sulfate, rather than ammonium sulfate, was employed as the auxiliary agent and the quantities of sodium hydroxide employed during the first and second conditioning steps were 1.0 and 0.2 pound per ton (dry feed basis), respectively.

The machine-discharge product of this example contained 0.44 percent TiO$_2$ and represented a weight recovery of 62.0 percent. Comparison of these results with the results of Example III, in which no auxiliary agent was used, shows that where magnesium sulfate was employed the grade of the machine-discharge product was markedly superior to that where no auxiliary agent was used (i.e., the TiO$_2$ content was much lower in the former case than in the latter).

*Example VII*

This example was similar to Example VI with the following exceptions: sodium sulfate, rather than magnesium sulfate, was employed as the auxiliary agent and the quantities of sodium hydroxide added during the first and second conditioning steps were 0.9 and 0.15 pound per ton (dry feed basis), respectively.

The machine-discharge product of this example was found to contain 0.55 percent $TiO_2$ and to represent a weight recovery of 74.8 percent. Comparison of these results with those of Example III, in which no auxiliary agent was used, shows that sodium sulfate effected no better grade or recovery of product than was achieved without an auxiliary agent.

Example VIII

This is an example of the use of my flotation treatment on a dispersed, crude, i.e., not fractionated, Georgia kaolin.

A 500-gram sample of dispersed, degritted (but not fractionated) Georgia kaolin (dry basis) was pulped into a laboratory 1000-gram Mineral Separation Airflow Flotation machine and conditioned therein (agitated without admittance of air), at a concentration of 10 percent solids, for five minutes with 4.0 lb./ton of magnesium sulfate, 1.0 lb./ton of sodium hydroxide, 5.0 lb./ton of red oil, and 0.4 lb./ton of pine oil, all reagent quantities being given as pounds per ton of dry feed kaolin.

The conditioned pulp was subjected to froth flotation treatment in the flotation machine for a period of 15 minutes, during which a froth-product concentrate of colored impurities was removed. The froth-product was repulped into the flotation machine, conditioned therein for two minutes with 0.77 lb./ton of red oil and 0.33 lb./ton of pine oil, these quantities being given as pounds per ton of dry feed kaolin.

The conditioned froth-product was subjected to froth-flotation treatment in the flotation machine for a period of three minutes and thus separated into a final froth-product and a machine-discharge middling product.

The metallurgical results of this test are below.

| Product | Percent Weight | Percent $TiO_2$ |
|---|---|---|
| Froth-product | 1.7 | 28.87. |
| Middling | 11.2 | 1.53. |
| Machine-discharge | 87.1 | 1.38. |
| Feed | 100 | 1.86 (Calculated value). |

The above results show that a machine-discharge product substantially lower in $TiO_2$ content than the feed clay was produced from a crude, unfractionated kaolin. The results also show that a high $TiO_2$ grade froth-product was produced by means of my flotation process, as well as a middling material lower in $TiO_2$ than the starting clay.

Example IX

This is an example of the use of my flotation treatment, employing a sulpho-oleic-acid prepared from red oil and sulfuric acid as the negative-ion collector.

A 500-gram charge (dry kaolin weight basis) of the dispersed, relatively coarse kaolin of Examples I through VII was pulped into a laboratory Minerals Separation Airflow Flotation machine and conditioned therein (agitated without admittance of air), at a concentration of 10 percent solids, for 5 minutes with 2.0 lb./ton of ammonium sulfate, 2.5 lb./ton of ammonium hydroxide, and 2.0 lb./ton of the sulpho-oleic-acid material, all reagent quantities being given as pounds per ton of dry feed kaolin. The sulpho-oleic-acid material was prepared by treating red oil with 10 percent of its weight of concentrated sulfuric acid and then stirring the mixture until it was cool.

The conditioned pulp was subjected to froth flotation treatment in the flotation machine for a period of five minutes, during which a froth-product concentrate of colored impurities was removed. After the five minutes of flotation, the machine-discharge pulp remaining in the flotation machine was conditioned for 5 minutes with 1.0 lb./ton of ammonium hydroxide and 0.5 lb./ton of sulpho-oleic-acid, all reagent quantities being given as pounds per ton of dry feed kaolin. The thus-conditioned machine-discharge pulp was again subjected to five minutes of froth flotation treatment and a second froth-product concentrate of colored impurities removed, leaving behind the final machine-discharge clay product.

The pH of the conditioned pulp, in each of the aforesaid conditioning steps, was 9.0.

The machine-discharge material was bleached with a zinc hydrosulfite bleaching liquor and then its brightness was determined to be 85.3 percent by TAPPI Standard Method T-646m-54.

Comparison of the above brightness with that achieved in Example I (flotation plus bleaching) shows that the present example using sulpho-oleic-acid as a collector produced approximately the same degree of brightness as did Example I.

I claim:
1. A method for improving the brightness of dispersed kaolin clay including the subjecting of said kaolin clay to negative-ion froth flotation treatment in an aqueous pulp, with a negative-ion reagent and an auxiliary agent from the group consisting of ammonium sulfate, magnesium sulfate and potassium sulfate, to thereby produce a froth-product material which is a concentrate of the colored impurities in the original clay and a machine-discharge clay product of improved brightness.

2. The method of claim 1 in which the kaolin clay comprises a relatively coarse fraction of a water-washed kaolin.

3. The method of claim 1 in which the negative-ion reagent is tall oil.

4. The method of claim 1 in which the negative-ion reagent is red oil.

5. A method for improving the brightness of dispersed kaolin clay including the steps of: subjecting said kaolin clay to negative-ion froth flotation treatment in an aqueous pulp, with a negative-ion reagent and an auxiliary agent from the group consisting of ammonium sulfate, magnesium sulfate and potassium sulfate, to thereby produce a froth-product material which is a concentrate of the colored impurities in the original clay and a machine-discharge clay product of improved brightness; and subjecting said machine-discharge product to a chemical bleaching treatment to further enhance its brightness.

6. The method of claim 5 in which the kaolin clay comprises a relatively coarse fraction of a water-washed kaolin.

7. The method of claim 5 in which the negative-ion reagent is tall oil.

8. The method of claim 5 in which the negative-ion reagent is red oil.

9. A method for improving the brightness of dispersed kaolin clay comprising the steps of: subjecting an aqueous pulp of the kaolin clay to conditioning with tall oil, ammonium sulfate and ammonium hydroxide; subjecting the thus-conditioned clay pulp to a froth flotation operation to thereby produce a froth-product which is a concentration of the colored impurities in the original clay and a machine-discharge; subjecting the machine-discharge to further conditioning with tall oil and ammonium hydroxide; subjecting the thus-conditioned machine-discharge to a froth flotation operation to thereby produce a second froth-product concentrate of colored impurities and a machine-discharge which is a clay material of improved brightness; and subjecting said machine-discharge to a chemical bleaching treatment to further enhance its brightness.

10. The method of claim 5 in which the machine-discharge clay product, before the chemical bleaching step, is subjected to further conditioning and froth flotation treatment to thereby produce a second froth-product concentrate of colored impurities and a final machine-discharge clay product of improved brightness.

11. The method of claim 5 in which the machine-discharge clay product, before the chemical bleaching step, is subjected to further conditioning and froth flotation treatment to thereby produce a second froth-product concentrate of colored impurities and a final machine-discharge clay product of improved brightness; combining the two froth-products; and subjecting the combined froth-products to a cleaner froth flotation operation to thereby produce a final froth-product concentrate of colored impurities and a machine-discharge middling material.

References Cited in the file of this patent

UNITED STATES PATENTS

| | | |
|---|---|---|
| 2,283,295 | Tartaron | May 19, 1942 |
| 2,363,029 | Weinig | Nov. 21, 1944 |
| 2,659,680 | Leek | Oct. 2, 1951 |

OTHER REFERENCES

Taggart; Handbook of Mineral Dressing, Wiley, 1945, pages 12–126.